United States Patent
Konrad et al.

(10) Patent No.: US 7,128,968 B2
(45) Date of Patent: *Oct. 31, 2006

(54) BIAXIALLY ORIENTED POLYESTER FILM WHICH IS MATT ON ONE SIDE, PROCESS FOR ITS PRODUCTION AND ITS USE

(75) Inventors: Matthias Konrad, Hofheim (DE); Herbert Peiffer, Mainz (DE); Gottfried Hilkert, Saulheim (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 53 days.

This patent is subject to a terminal disclaimer.

(21) Appl. No.: 10/760,979

(22) Filed: Jan. 20, 2004

(65) Prior Publication Data
US 2004/0151897 A1 Aug. 5, 2004

(30) Foreign Application Priority Data
Jan. 28, 2003 (DE) ................................ 103 03 144

(51) Int. Cl.
B32B 27/08 (2006.01)
B32B 27/18 (2006.01)
B32B 27/20 (2006.01)
B32B 27/36 (2006.01)
B32B 37/15 (2006.01)

(52) U.S. Cl. ..................... 428/323; 428/327; 428/480; 428/910; 264/288.4; 264/290.2; 528/302; 528/308; 528/308.1; 528/308.6

(58) Field of Classification Search ..................... None
See application file for complete search history.

(56) References Cited

U.S. PATENT DOCUMENTS

| | | | | |
|---|---|---|---|---|
| 3,154,461 A | | 10/1964 | Johnson ...................... 161/116 |
| 4,399,179 A | * | 8/1983 | Minami et al. ............. 428/212 |
| 4,818,581 A | * | 4/1989 | Katoh et al. ................ 428/143 |
| 5,077,118 A | * | 12/1991 | Hasegawa et al. .......... 428/149 |
| 5,240,779 A | * | 8/1993 | Ono et al. ................... 428/458 |
| 5,874,496 A | * | 2/1999 | Kurz et al. .................. 524/425 |
| 5,912,074 A | * | 6/1999 | Aoyama et al. ............ 428/327 |
| 5,955,181 A | * | 9/1999 | Peiffer et al. ............... 428/212 |
| 6,270,888 B1 | * | 8/2001 | Rutter et al. ................ 428/347 |
| 6,607,808 B1 | * | 8/2003 | Peiffer et al. ............... 428/141 |
| 6,627,295 B1 | * | 9/2003 | Peiffer et al. ............... 428/141 |
| 6,630,224 B1 | * | 10/2003 | Peiffer et al. ............... 428/141 |
| 6,670,030 B1 | * | 12/2003 | Uchida et al. .............. 428/323 |
| 6,797,359 B1 | * | 9/2004 | Janssens et al. ............ 428/141 |
| 6,855,395 B1 | * | 2/2005 | Janssens et al. ............ 428/141 |
| 2002/0068158 A1 | * | 6/2002 | Peiffer et al. ............... 428/220 |
| 2002/0068159 A1 | * | 6/2002 | Peiffer et al. ............... 428/220 |

(Continued)

FOREIGN PATENT DOCUMENTS

DE  2 353 347  10/1972

(Continued)

Primary Examiner—Vivian Chen
(74) Attorney, Agent, or Firm—ProPat, L.L.C.

(57) ABSTRACT

Biaxially oriented polyester films which have at least one polyester-containing base layer (B) and at least one matt overlayer (A), the overlayer (A) comprising particles, preferably $SiO_2$, which have a median diameter of from 2 to 10 μm and have a SPAN98 of $\leq 2$, and the overlayer (A) comprising a polyester which has isophthalic acid units, feature in particular low opacity, high transparency, low gloss of the overlayer (A) and high processing reliability, and are therefore suitable as flexible packaging films even for use on high-speed packaging machinery.

18 Claims, 1 Drawing Sheet

U.S. PATENT DOCUMENTS

| | | | |
|---|---|---|---|
| 2002/0071945 A1* | 6/2002 | Peiffer et al. | 428/220 |
| 2002/0160168 A1* | 10/2002 | Peiffer et al. | 428/215 |
| 2002/0160171 A1* | 10/2002 | Peiffer et al. | 428/220 |
| 2004/0009342 A1* | 1/2004 | Janssens et al. | 428/323 |
| 2004/0009355 A1* | 1/2004 | Janssens et al. | 428/430 |
| 2004/0142147 A1* | 7/2004 | Peiffer et al. | 428/141 |
| 2004/0142194 A1* | 7/2004 | Peiffer et al. | 428/500 |
| 2004/0146724 A1* | 7/2004 | Peiffer et al. | 428/458 |
| 2004/0151987 A1* | 8/2004 | Kawase et al. | 429/338 |
| 2004/0157069 A1* | 8/2004 | Klein et al. | 428/481 |

FOREIGN PATENT DOCUMENTS

| | | |
|---|---|---|
| EP | 0 053 498 A2 | 6/1982 |
| EP | 0 347 646 A2 | 12/1989 |
| EP | 0 602 964 A1 | 6/1994 |
| EP | 0 675 158 B1 | 10/1995 |
| EP | 1 197 327 A1 * | 4/2002 |
| EP | 1 197 328 A2 * | 4/2002 |
| EP | 1 197 328 A2 | 8/2002 |
| EP | 1 234 848 A1 * | 8/2002 |
| EP | 1 197 326 A1 * | 4/2004 |
| JP | XP002276539 A | 11/1983 |
| JP | XP002276645 A | 3/1994 |
| JP | 2001-347592 A | 12/2001 |
| JP | 2002-200723 * | 7/2002 |
| JP | 2002-200724 * | 7/2002 |
| WO | WO 99/62694 A1 | 12/1999 |
| WO | WO 01/92011 A1 | 12/2001 |
| WO | WO 02/38673 A2 | 5/2002 |

* cited by examiner

BIAXIALLY ORIENTED POLYESTER FILM WHICH IS MATT ON ONE SIDE, PROCESS FOR ITS PRODUCTION AND ITS USE

FIELD OF THE INVENTION

The invention relates to a coextruded, biaxially oriented polyester film which is matt on one side and consists of at least one base layer (B) and at least one matt overlayer (A) applied to this base layer (B). The film features a characteristic matt surface of the overlayer (A) and low opacity. The invention further relates to a process for producing the film and to its use.

BACKGROUND OF THE INVENTION

The packaging industry has a high demand for transparent, highly glossy plastics films, for example biaxially oriented polypropylene or biaxially oriented polyester films. In addition, there is to an increasing degree a demand for those transparent films in which at least one surface layer is not highly glossy, but rather features a characteristic matt appearance and thus, for example, confers on the packaging a particularly attractive and therefore commercially effective appearance.

Typical applications for polyester films having at least one matt surface are outer packagings for coffee, tea, soups or of selected drugstore items. In addition to the commercially effective appearance, the matt side of the film renders the surface nonreflective.

EP-A-0 347 646 describes a biaxially oriented polyester film which has at least one overlayer A which contains a filler in a concentration of from 0.5 to 50%, in which the diameter of this filler is in a certain ratio to the layer thickness of the overlayer A. In addition, the overlayer A has a certain thickness and a certain degree of crystallization which is determined with the aid of Raman spectroscopy. As a consequence of the topography of the overlayer A, the film is especially suitable for magnetic recording tapes. The document gives no information about the gloss of the overlayer A achieved. A film produced according to EP-A-0 347 646 (Example 1) did not have the desired matt surface.

EP-A-0 053 498 describes a multilayer, biaxially oriented polyester film which has a transparent base layer (B) and a further layer (A) having a matt appearance and applied to at least one side of this layer. This layer having a matt appearance consists substantially of a polyethylene terephthalate copolyester which contains

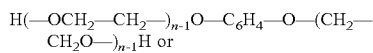

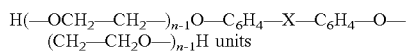

(n is an integer from 2 to 140, X is —CH$_2$—, —C(CH$_3$)$_2$— or —SO$_2$—) and inert inorganic particles having an average diameter of from 0.3 to 20 µm in a concentration of from 3 to 40%, based on the layer having a matt appearance. The film features a high degree of mattness (gloss less than 15) and a transparency which is still acceptable for certain applications (greater than 60%). A disadvantage of this film is that it is not printable in the case of an ABA structure and cannot be processed, especially on high-speed machines, in the case of an AB structure. Moreover, it is too opaque for many applications and has deficiencies in the production.

The prior art likewise discloses matt, biaxially oriented polyester films having a milky appearance.

DE-A-23 53 347 describes a process for preparing a single-layer or multilayer, milky polyester film, which comprises forming a loosely blended mixture of particles of a linear polyester with from 3 to 27% by weight of a homopolymer or copolymer of ethylene or propylene, extruding the blend as a film, quenching and biaxially orienting the film by stretching it in mutually perpendicular directions, and heat setting the film. A disadvantage of the process is that the regrind (substantially a mixture of polyester raw material and ethylene or propylene copolymer) which occurs in the production of the film can no longer be reused in the film production, since the film otherwise becomes yellow. This makes the process uneconomic and the yellowish film produced with regrind was not able to become established on the market. When the concentration of the copolymer in the polyester is increased, the film generally loses its milky character and becomes white with high opacity.

U.S. Pat. No. 3,154,461 claims a biaxially oriented film of a thermoplastic (for example polyethylene terephthalate, polypropylene), said film having a matt surface and containing incompressible particles (for example calcium carbonate, silicon dioxide) in a size of from 0.3 to 20 µm and in a concentration of from 1 to 25%. However, this film is too opaque for many applications.

It is therefore an object of the present invention to provide a biaxially oriented polyester film which is matt on at least one side and does not have the disadvantages of the prior art films mentioned, and features in particular a high degree of mattness with simultaneously low opacity, in particular low volume opacity, and good transparency, very good producibility and very good processability. In addition, it should be ensured that the film can also be processed on high-speed processing machines. In the production of the film, it should also be ensured that it is possible to recycle the offcut material occurring in the course of film production back to the production process as regrind, without the physical and optical properties of the film being significantly adversely affected.

SUMMARY OF THE INVENTION

The object is achieved by a biaxially oriented polyester film which has at least one base layer (B) and at least one matt overlayer (A), wherein the overlayer (A) comprises particles which preferably have a median particle diameter $d_{50}$ of from 2 to 10 µm and have a SPAN98 smaller than or equal to ($\leq$) 2, and wherein the overlayer (A) comprises a polyester which preferably has from 4 to 30 mol % of isophthalic acid units, based on the total amount of acid in the polyester in this layer.

The matt overlayer (A) contains the particles preferably in a concentration of from 10 000 to 70 000 ppm.

DETAILED DESCRIPTION OF THE INVENTION

Figure 1:
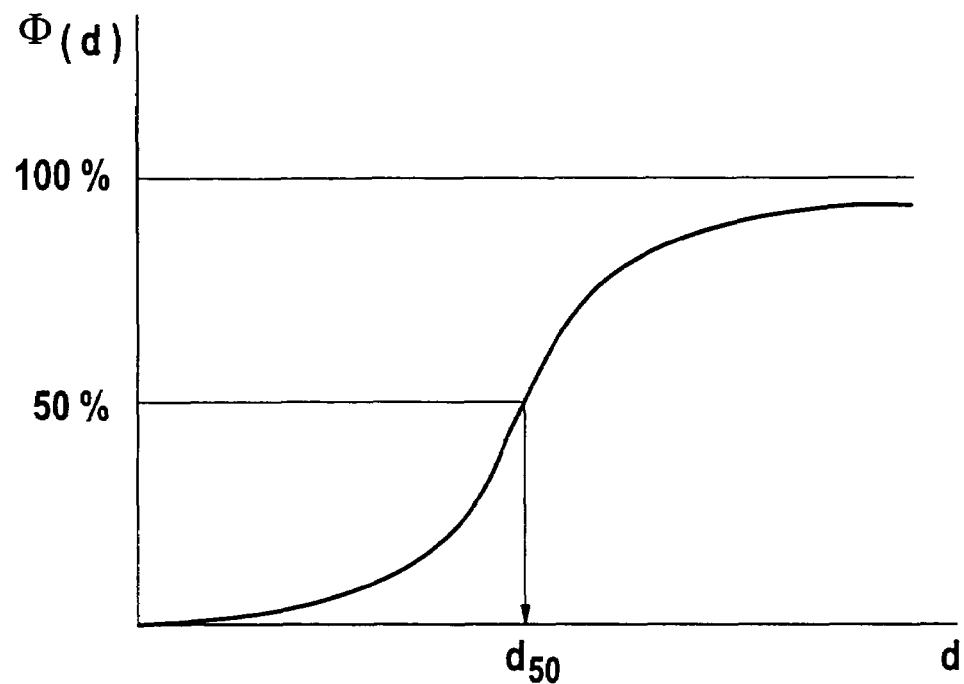
FIG. 1 is an exemplary plot of a cumulative particle size distribution curve illustrating a median particle diamter, $d_{50}$.

According to the invention, the film has at least two layers, and its layers are in that case the base layer (B) and the matt overlayer (A). In a preferred embodiment of the invention, the film has a three-layer structure and has, on one side of the layer (B) (=base layer), the overlayer (A) according to the invention and, on the other side of the layer (B), a further layer (C). In this case, the two layers (A) form (C) form the overlayers (A) and (C).

The base layer (B) of the film preferably contains at least 80% by weight of thermoplastic polyester, in particular at least 90% by weight of thermoplastic polyester, based on the total weight of this layer. Suitable for this purpose are, for example, polyesters of ethylene glycol and terephthalic acid (=polyethylene terephthalate, PET), of ethylene glycol and naphthalene-2,6-dicarboxylic acid (=polyethylene 2,6-naphthalate, PEN), of 1,4-bishydroxymethylcyclo-hexane and terephthalic acid [=poly(1,4-cyclohexanedimethylene terephthalate), PCDT], and also of ethylene glycol, naphthalene-2,6-dicarboxylic acid and biphenyl-4,4'-dicarboxylic acid (=polyethylene 2,6-naphthalate bibenzoate, PENBB). Particular preference is given to polyesters which consist of at least 90 mol %, in particular at least 95 mol %, of ethylene glycol and terephthalic acid units or of ethylene glycol and naphthalene-2,6-dicarboxylic acid units. In a very preferred embodiment, the base layer consists of polyethylene terephthalate homopolymer. The remaining monomer units stem from other aliphatic, cycloaliphatic or aromatic diols or other dicarboxylic acids. In addition to the above-mentioned 80 or 90% by weight of thermoplastic polyester, up to 20% by weight, preferably up to 10% by weight, of, for example, polybutylene terephthalate (PBT) or glycol-modified PET may be present.

Suitable other aliphatic diols are, for example, diethylene glycol, triethylene glycol, aliphatic glycols of the general formula $HO-(CH_2)_n-OH$ where n is an integer from 3 to 6 (propane-1,3-diol, butane-1,4-diol, pentane-1,5-diol and hexane-1,6-diol) or branched aliphatic glycols having up to 6 carbon atoms. Of the cycloaliphatic diols, mention should be made of cyclohexanediols (in particular cyclohexane-1,4-diol). Suitable other aromatic diols correspond, for example, to the formula $HO-C_6H_4-X-C_6H_4-OH$ where X is $-CH_2-$, $-C(CH_3)_2-$, $-C(CF_3)_2-$, $-O-$, $-S-$ or $-SO_2-$. In addition, bisphenols of the formula $HO-C_6H_4-C_6H_4-OH$ are also very suitable.

Other aromatic dicarboxylic acids are preferably benzenedicarboxylic acids, naphthalenedicarboxylic acids, for example naphthalene-1,4- or -1,6-dicarboxylic acid, biphenyl-x,x'-dicarboxylic acids, in particular biphenyl-4,4'-dicarboxylic acid, diphenylacetylene-x,x'-dicarboxylic acids, in particular diphenylacetylene-4,4'-dicarboxylic acid, or stilbene-x,x'-dicarboxylic acids. Of the cycloaliphatic dicarboxylic acids, mention should be made of cyclohexanedicarboxylic acids, in particular cyclohexane-1,4-dicarboxylic acid. Of the aliphatic dicarboxylic acids, the ($C_3$ to $C_{19}$) alkanedioic acids are particularly suitable, and the alkane moiety may be straight-chain or branched.

The polyesters may be prepared, for example, by the known transesterification processes. These processes start from dicarboxylic esters and diols which are reacted with the customary transesterification catalysts, such as zinc salts, calcium salts, lithium salts, magnesium salts and manganese salts. The intermediates are then polycondensed in the presence of generally customary polycondensation catalysts such as antimony trioxide or titanium salts. The preparation may equally efficiently be effected by the direct esterification process in the presence of polycondensation catalysts. This starts directly from the dicarboxylic acids and the diols.

The matt overlayer (A) applied to the base layer (B) by coextrusion is preferably composed predominantly on the basis of polyester. According to the invention, the matt overlayer (A) comprises a polyester which contains preferably 4 to 30 mol % of isophthalic acid, preferably from 6 to 28 mol % of isophthalic acid and more preferably from 8 to 26 mol % of isophthalic acid, based on the total amount of acid of the polyester in this layer. The remaining monomer units stem from other aliphatic, cycloaliphatic or aromatic dicarboxylic acids or diols, as may also occur-in the base layer and have already been described there. The polyesters described for the base layer (B) are thus also suitable in principle, after appropriate modification, for the overlayer (A).

The raw material for the overlayer (A) can be prepared, for example, as a mixture or as a blend by copolymerizing the individual monomers or via masterbatches of different individual polymers.

In a preferred embodiment of the invention, the matt overlayer (A) contains a copolyester which is composed of terephthalate units and isophthalate units and of ethylene glycol units. The proportion of terephthalate units in this copolyester, based on the total amount of acid, is preferably from 70 to 96 mol % and the corresponding proportion of isophthalate units is from 30 to 4 mol %. Particular preference is given in this context to those copolyesters in which the proportion of terephthalate units is from 72 to 94 mol % and the corresponding proportion of isophthalate units is from 28 to 6 mol %. Very particular preference is given to those polyesters in which the proportion of terephthalate units is from 74 to 92 mol % and the corresponding proportion of isophthalate units is from 26 to 8 mol %.

In principle, the polymers used for the residual proportion, if any, of the polymers present in the overlayer (A) are the same as have already been described for the base layer (B). Surprisingly, it has been found that the use of the above-described raw materials for the overlayer (A) results in a film having particularly low opacity, especially low volume opacity.

To achieve the desired mattness/the desired degree of mattness, the overlayer (A) additionally comprises a particle system which is characterized by the following set of preferred parameters:

a) According to the invention, the matt overlayer (A) contains particles (=antiblocking agents) having a particle diameter $d_{50}$ of from 2.0 to 10 μm. It has been found to be particularly advantageous to use particles having a median particle diameter $d_{50}$ of from 2.2 to 9 μm, preferably from 2.4 to 8 μm and more preferably from 2.6 to 7 μm. When particles are used which have a diameter which is below 2.0 μm, increased opacity occurs (at comparable concentrations). Particles having a diameter greater than 10 μm generally cause filter problems.

b) According to the invention, the overlayer (A) contains particles whose diameters have a spread which is described by a SPAN98 of ≦2.0 (see test method for definition of the SPAN98). Preference is given to the SPAN98 being ≦1.9, and particular preference to the SPAN98 being ≦1.8. In contrast, when the overlayer (A) of the film contains a particle system in which the SPAN98 of the diameter is greater than 2.0, the gloss of the overlayer (A) becomes higher, which is undesired.

c) According to the invention, the overlayer (A) contains particles in a concentration of from 10 000 to 70 000 ppm, based on the total weight of this layer (10 000 ppm=1% by weight). The concentration of the particles is preferably from 15 000 to 65 000 ppm and more preferably from 20 000 to 60 000 ppm. In contrast, when the overlayer (A) of the film contains a particle system in which the particles are present in a concentration of less than 10 000 ppm, it is less suitable for use as a matt film. In contrast, when the overlayer (A) of the film contains a particle system in which the particles are present in a concentration of more than 70 000 ppm, the opacity of the film becomes too large under some circumstances.

Typical particle systems which promote the mattness of the film and are therefore preferred are inorganic and/or organic particles, for example calcium carbonate, amorphous silica, talc, magnesium carbonate, barium carbonate, calcium sulfate, barium sulfate, lithium phosphate, calcium phosphate, magnesium phosphate, aluminum oxide, lithium fluoride, calcium, barium, zinc or manganese salts of the dicarboxylic acids used, carbon black, titanium dioxide, kaolin or crosslinked polymer particles, for example polystyrene or acrylate particles.

In addition, mixtures of two or more different particle systems or mixtures of particle systems having the same chemical composition but different particle size may also be selected. The particles may be added to the polymers of the individual layers of the film in the concentrations which are advantageous in each case, for example as a glycolic dispersion during the polycondensation of via masterbatches in the course of the extrusion.

Preferred particles are synthetically produced $SiO_2$ particles (in colloidal form). These particles are very efficiently incorporated into the polymer matrix and only generate a few vacuoles (cavities). Vacuoles form at the particles in the course of biaxial orientation, generally cause opacity and are therefore not very suitable for the present invention. To (synthetically) produce the $SiO_2$ particles (also known as silica gel), sulfuric acid and sodium silicate are initially mixed together under controlled conditions to form hydrosol. This eventually becomes a hard, transparent mass which is known as a hydrogel. After separation of the by-produced sodium sulfate by a washing process, it may be dried and further processed. Control of the washing water pH and of the drying conditions allows the important physical parameters, for example pore volume, pore size and the size of the surface of the resulting silica gel, to be varied. The desired particle size (for example the $d_{50}$ value) and particle size distribution (for example the SPAN98) are obtained by suitable grinding of the silica gel (for example mechanically or hydromechanically). Manufacturers of such particles are, for example, Grace (USA), Fuji (Japan), Degussa (Germany) and Ineos (Great Britain).

In a preferred embodiment, the mat: overlayer (A) is also characterized by the following set of parameters:
1) The roughness of the matt side of the film, expressed by its $R_a$ value, is in the range from 150 to 1000 nm, preferably from 175 to 950 nm, more preferably from 200 to 900 nm. Values smaller than 150 nm have adverse effects on the degree of mattness of the surface; values larger than 1000 nm impair the optical properties of the film.
2) The measurement of the surface gas flow is in the range from 0.1 to 50 s, preferably in the range from 1 to 45 s. At values above 50, the degree of mattness of the film is adversely affected.
3) The coefficient of friction (COF) of the mat: side of the film is less than 0.5, preferably less than 0.45 and more preferably less than 0.4.

In a further preferred embodiment of the invention, the planar orientation $\Delta p$ of the film according to the invention is less than 0.170, in particular less than 0.168 and more preferably less than 0.166.

The base layer (B) may likewise additionally contain customary additives, for example stabilizers and/or particles (=fillers). Advantageous examples of useful stabilizers include phosphorus compounds, such as phosphoric acid or phosphoric esters.

Typical particles (fillers) for the base layer (B) are the inorganic and/or organic particles specified for the overlayer(s), for example calcium carbonate, amorphous silica, talc, magnesium carbonate, barium carbonate, calcium sulfate, barium sulfate, lithium phosphate, calcium phosphate, magnesium phosphate, aluminum oxide, lithium fluoride, calcium, barium, zinc or manganese salts of the dicarboxylic acids used, carbon black, titanium dioxide, kaolin or crosslinked polystyrene or acrylate particles.

In a particularly advantageous embodiment, the base layer contains no pigments or only pigments introduced via the regrind. This results in a film having very particularly low opacity.

In the preferred use form, the film consists of three layers, the base layer (B) and overlayers (A) and (C) applied to both sides of this base layer, and the overlayers (A) and (C) may be the same or different. The overlayer (C) preferably contains the polymers described for the base layer (B). In particular, the overlayer (C) preferably contains the abovementioned fillers (particles), in order to further improve the processing performance of the film.

Between the base layer (B) and the overlayers (A) and/or (C) may optionally also be disposed one or more intermediate layers. These may again consist of the polymers described for the base layer (B). In a particularly preferred embodiment, the intermediate layer consists of the polyester used for the base layer (B). The intermediate layer may also contain the customary additives described. The thickness of the intermediate layer is generally greater than 0.3 µm and is preferably in the range from 0.5 to 15 µm, in particular in the range from 1.0 to 10 µm, more preferably in the range from 1.0 to 5 µm.

In the particularly advantageous three-layer embodiment of the film according to the invention, the thickness of the overlayers (A) and (C) is generally in the range from 0.1 to 5.0 µm, preferably in the range from 0.3 to 4.5 µm and more preferably in the range from 0.5 to 4.0 µm, and the matt overlayer (A) and the overlayer (C) may be of the same or different thicknesses.

The total thickness of the polyester film according to the invention may vary within wide limits. It is generally in the range from 3 to 350 µm, in particular from 4 to 300 µm, preferably from 5 to 250 µm, and the base layer (B) accounts for a proportion of preferably from 5 to 97% of the total thickness.

In summary, the film according to the invention features in particular low gloss of the film surface (A), comparatively low opacity and high transparency. In addition it has good winding and processing performance.

The gloss of the film surface A is preferably less than 70. In a preferred embodiment, the gloss of this side is less than 60 and in a particularly preferred embodiment less than 50. This film surface thus imparts a commercially particularly highly effective character and is therefore suitable in particular as the external surface in a packaging.

The opacity of the film is preferably smaller than 45%. In a preferred embodiment, the opacity of the film is less than 40% and in a particularly preferred embodiment less than 35%. The transparency of the film is preferably greater than 80%. In a preferred embodiment, the transparency of the film is more than 84% and in a particularly preferred embodiment more than 88%. The comparatively low opacity and high transparency of the film (compared with a matt monofilm, see comparative example) allow the film according to the invention to be printed, for example, in transfer printing, in which case the definition of the print is very good.

The volume opacity of the film is preferably smaller than 15%. In a preferred embodiment, the volume opacity of the film is less than 10% and in a particularly preferred embodiment less than 5%.

The invention also relates to a process for producing the polyester film according to the invention by the coextrusion process disclosed by the literature.

The procedure in this process is that the melts corresponding to the individual layers (A), (B) and (C) of the film are coextruded through a flat-film die and shaped to melt films, the film obtained in this way is drawn off on one or more rolls for solidification, the film is subsequently biaxially stretched (oriented), the biaxially stretched film is heat-set and where appropriate also corona- or flame-treated on the surface layer provided for treatment.

The biaxial stretching (orientation) is generally carried out in succession, and preference is given to the successive biaxial stretching in which stretching is effected first longitudinally (in machine direction) and then transversely (at right angles to machine direction).

Initially, as is customary in coextrusion processes, the polymer or the polymer mixtures for the individual layers are each compressed and liquefied in an extruder, and any additives provided as additions may be present in the polymer or in the polymer mixture. Preference is given to adding these additives to the starting polymer in the form of masterbatches. The melts are then simultaneously compressed through a flat-film die (slot die), and the extruded multilayer melt is drawn off on one or more takeoff rolls, in the course of which the melt cools and solidifies to a prefilm.

The biaxial stretching is generally carried out sequentially. Preference is given to stretching the prefilm initially in longitudinal direction (i.e. in machine direction=MD) and subsequently in transverse direction (i.e. at right angles to the machine direction, TD). This leads to spatial alignment (orientation) of the polymer chains. The stretching in longitudinal direction can be carried out with the aid of two rolls rotating at different speeds in accordance with the desired stretching ratio. For transverse stretching, an appropriate tenter frame is generally used, into which the film is clamped at both edges and then stretched at both sides at elevated temperature.

The temperature at which the stretching is carried out may vary within a relatively wide range and depends upon the desired properties of the film. In general, the longitudinal stretching is carried out at a temperature in the range from 80 to 130° C. and the transverse stretching in the range from 80 to 150° C. The longitudinal stretching ratio is generally in the range from 2.5:1 to 6:1, preferably from 3:1 to 5.5:1. The transverse stretching ratio is generally in the range from 3.0:1 to 5.0:1, preferably from 3.5:1 to 4.5:1. Before the transverse stretching, one or both surfaces of the film may be coated inline by the known processes. The inline coating may serve, for example, to improve adhesion of a metal layer or of a printing ink which might possibly be applied later, or else to improve the antistatic performance or the processing performance of the film.

For the preparation of a film having a very high degree of mattness (=very low gloss) and improved transparency, it has been found to be particularly advantageous when the planar orientation $\Delta p$ of the film is less than $\Delta p=0.170$, preferably less than $\Delta p=0.168$ and very preferably less than $\Delta p=0.166$. The smaller planar orientation $\Delta p$ has the consequence that the tendency to form vacuoles around the particles is reduced and the roughnesses of the surfaces increase.

It has been found that the parameters which have a significant influence on the planar orientation $\Delta p$ are the process parameters in the longitudinal stretching and in the transverse stretching, and also the SV value of the raw material used. The process parameters include in particular the stretching ratios in longitudinal and in transverse direction ($\lambda_{MD}$ and $\lambda_{TD}$) and also the stretching temperatures in longitudinal and in transverse direction ($T_{MD}$ and $T_{TD}$). For example, when a machine is used to obtain a planar orientation of the film of $\Delta p=0.171$ with the parameter set $\lambda_{MD}=4.8$ and $\lambda_{TD}=4.0$, $T_{MD}$=from 80 to 118° C. and $T_{TD}$=from 80 to 125° C., increasing the longitudinal stretching temperature to $T_{MD}$=from 80 to 125° C. or increasing the transverse stretching temperature to $T_{TD}$ from 80 to 135° C. or reducing the longitudinal stretching ratio to $\lambda_{MD}=4.3$ or reducing the transverse stretching ratio to $\lambda_{TD}=3.7$ results in a planar orientation $\Delta p$ which is within the desired range. The temperatures specified relate to the particular roll temperatures in the longitudinal stretching, and to the film temperatures in the transverse stretching, which are measured by means of IR.

In the subsequent heat-setting, the film is kept at a temperature of from approx. 150 to 250° C. over a period of from about 0.1 to 10 s. Subsequently, the film is wound up in a customary manner.

Preference is given, after the biaxial stretching, to corona- or flame-treating one or both surfaces of the film by one of the known methods. Preference is given to setting the intensity of treatment in such a way that the resulting surface tension is in the range of above 45 mN/m.

To establish further desired properties, the film may additionally be coated. Typical coatings are coatings having adhesion-promoting, antistatic, slip-improving or release action. One possibility is to apply these additional layers to the film by inline coating, preferably by means of aqueous dispersions, before the stretching step in transverse direction.

The film according to the invention features in particular outstanding optical properties, i.e. low gloss and high transparency, very good handling and very good processing performance.

In addition, when producing the film, it is guaranteed that offcut material which occurs in relatively large amounts in the production of the film can be fed back again to the extrusion as regrind in an amount in the range from about 20 to 60% by weight, based on the total weight of the film, without the physical properties of the film being significantly adversely affected, and especially not its optical appearance.

The film is therefore very suitable for use in flexible packaging, and in particular where its outstanding optical properties and its good processability are used to full effect, for example when used on high-speed packaging machinery.

The table which follows (Table 1) once again summarizes the most important inventive and preferred film properties.

TABLE 1

|  | Inventive range | Preferred | More preferred | Unit | Test method |
|---|---|---|---|---|---|
| Overlayer A |  |  |  |  |  |
| Thickness of the overlayer | >0.1 | 0.3 to 4.5 | 0.5 to 4 | μm |  |
| Particle diameter $d_{50}$ | 2.0 to 10 | 2.2 to 9 | 2.4 to 8 | μm | as described |
| SPAN 98 spread | ≦2.0 | ≦1.9 | ≦1.8 | — | as described |
| Filler concentration | 10 000 to 70 000 | 15 000 to 65 000 | 20 000 to 60 000 | ppm |  |
| Isophthalate content of the polymer | 4 to 30 | 6 to 28 | 8 to 26 | mol % |  |
| Average roughness $R_a$ | 150 to 1000 | 175 to 950 | 200 to 900 | nm | DIN 4768, cutoff of 0.25 mm |
| COF A/A | <0.5 | <0.45 | <0.40 |  | DIN 53375 |
| Gloss, angle of incidence 60° | <70 | <60 | <50 |  | DIN 67530 |
| Measurement range for the surface gas flow | 1 to 50 | 1 to 45 | 1 to 40 | sec | as described |
| Film properties |  |  |  |  |  |
| Opacity | <45 | <40 | <35 | % | ASTM D 1003–52 |
| Transparency | >80 | >84 | >88 |  | as described |
| Volume opacity | <15 | <10 | <5 | % | as described |
| Planar orientation Δp | >0.170 | <0.168 | <0.166 | — | as described |

To characterize the raw materials and the films, the following test methods were used:
DIN=Deutsches Institut für Normung
[German Institute for Standardization]
ASTM=American Society for Testing and Materials SV Value (Standard Viscosity)

The standard viscosity SV (DCA) is measured in dichloroacetic acid, based on DIN 53726. The intrinsic viscosity (IV) is calculated from the standard viscosity as follows:

$$IV(DCA)=6.907 \cdot 10^{-4} \, SV \, (DCA)+0.063096$$

Surface Tension

The surface tension was determined by means of what is known as the ink method (DIN 53 364).

Opacity

The opacity was determined according to Hölz based on ASTM-D 1003-52, except that, instead of a 4° pinhole diaphragm, a 1° slot diaphragm was used.

Volume Opacity

For the measurement of the volume opacity, a film sample is clamped into a frame and immersed into a cuvette having immersion liquid. The film sample has to be wetted completely with the liquid from both sides. The immersion liquid should have a refractive index between 1.50 and 1.65; for example, an immersion oil from Merck, Germany (No. 104699) having a refractive index of 1.516 was used. The cuvette having the film sample is introduced into the beam path of an opacity measuring instrument. The opacity value is measured and the value of the liquid-filled cuvette without film sample is substracted as its zero value. The resulting value is equal to the volume opacity value.

Gloss

The gloss was determined to DIN 67 530. The reflector value was measured as a characteristic optical parameter for the surface of a film. Based on the standards ASTM-D 523-78 and ISO 2813, the angle of incidence was set to 20° or 60°. A light beam hits the flat test surface at the angle of incidence set and is reflected or scattered by it. The light beams incident upon the photoelectronic detector are displayed as a proportional electrical quantity. The measurement is dimensionless and has to be quoted together with the angle of incidence.

Surface Gas Flow Time

The principle of the measurement method is based on the air flow between one side of a film and a smooth silicon wafer plate. The air flows from the environment into an evacuated space, and the interface between film and silicon wafer plate serves as the flow resistance.

A round film specimen is placed on a silicon wafer plate in whose middle there is a hole which ensures the connection to the receptacle. The receptacle is evacuated to a pressure of less than 0.1 mbar. The time in seconds which is taken by the air to bring about a pressure rise of 56 mbar in the receptacle is determined.

Measurement Conditions:

| measurement surface area | 45.1 cm$^2$ |
|---|---|
| weight applied | 1276 g |
| air temperature | 23° C. |
| air humidity | 50% relative humidity |
| total gas volume | 1.2 cm$^3$ |
| pressure differential | 56 mbar |

Roughness

The roughness $R_a$ of the film was determined to DIN 4768 at a cutoff of 0.25 mm. Measurement was effected not on a glass plate, but rather in a ring. In the ring method, the film is clamped into a ring, so that neither of the two surfaces touches a third surface (for example glass).

Planar Orientation Δp

The planar orientation is determined via the measurement of the refractive indices with an Abbe refractometer from Kruss Optronic (Germany). The planar orientation is always measured on the glossier side of the film. The determination of the refractive indices has already been reproduced comprehensively, for example, in EP-A-0 952 176, page 10. Reference is therefore made here explicitly to this document. The orientation values are then calculated from the refractive indices by the following formulae:

$$\Delta n = n_{MD} - n_{TD}$$

$$\Delta p = (n_{MD} + n_{TD})/2 - n_z$$

$$n_{av} = (n_{MD} + n_{TD} + n_z)/3$$

Measurement of the Median Diameter $d_{50}$ (Median Particle Diameter)

The determination of the median particle size $d_{50}$ was carried out on a Master Sizer from Malvern Instruments, Great Britain by means of laser scanning [other measuring instruments are, for example, Horiba LA 500 (Horiba Europe GmbH, Germany) and Helos (Sympathec, Germany), which use the same measurement principle)]. To this end, the samples were introduced into a cuvette with water and this was then placed in the measuring instrument. Laser is used to scan the dispersion and the signal is compared to a calibration curve to determine the particle size distribution. The particle size distribution is characterized by two parameters, the median value $d_{50}$ (=measure of the position of the average value) and the degree of spread, known as the SPAN98 (=measure of the spread of the particle diameter). The measuring procedure is automatic and also includes the mathematical determination of the $d_{50}$ value. By definition, the $d_{50}$ value is determined from the (relative) cumulative curve of the particle size distribution: the point at which the 50% ordinate value cuts the cumulative curve provides the desired $d_{50}$ value on the abscissa axis [also referred to as median, cf. FIG. 1, $\Phi(d)$=(relative) sum of the particles].

Measurement of the SPAN98

The determination of the degree of spread, the SPAN98, was carried out with the same measuring instrument as described above for the determination of the average diameter $d_{50}$. The SPAN98 is defined as follows:

$$SPAN98 = \frac{d_{98} - d_{10}}{d_{50}}$$

Figure 2:
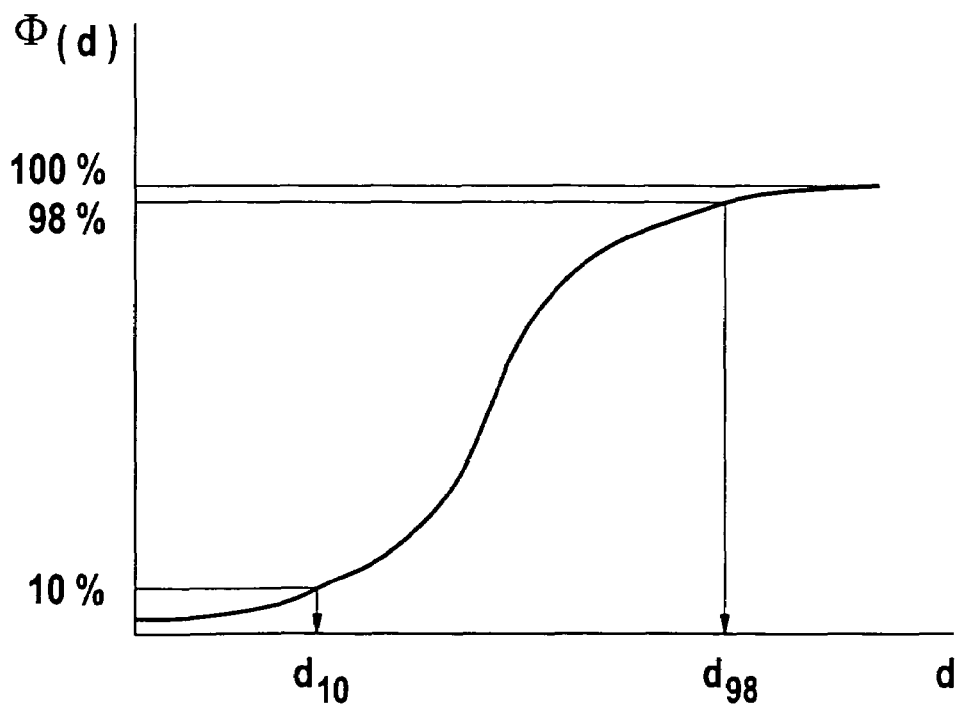
FIG. 2 is an exemplary plot of a cumulative particle size distribution curve illustrating $d_{98}$ and $d_{10}$.

The basis of the determination of $d_{98}$ and $d_{10}$ is again the (relative) cumulative curve of the particle size distribution. The point at which the 98% ordinate value cuts the cumulative curve immediately provides the desired $d_{98}$ value on the abscissa axis, and the point at which the 10% ordinate value of the cumulative curve cuts the curve provides the desired $d_{10}$ value on the abscissa axis (cf. FIG. 2). The transparency was measured using a Haze TC from Pausch Messtechnik, Germany, or Hazegard-plus from Byk-Gardner, USA, to ASTM D 1003-61.

The invention is illustrated in more detail hereinbelow with the aid of examples.

EXAMPLE 1

Chips of polyethylene terephthalate (prepared via the transesterification process using Mn as the transesterification catalyst, Mn concentration in the polymer: 100 ppm) were dried at a temperature of 150° C. to a residual moisture content of below 100 ppm and fed to the extruder for the base layer (B). Chips of polyethylene terephthalate and a filler were likewise fed to the extruder for the nonmatt overlayer (C). In addition, chips of polyethylene terephthalate (prepared via the transesterification process using Mn as the transesterification catalyst, Mn concentration: 100 ppm) were dried at a temperature of 150° C. to a residual moisture content of below 100 ppm and fed together with the filler to the extruder for the matt overlayer (A).

Coextrusion and subsequent stepwise orientation in longitudinal and transverse direction were then used to produce a transparent, three-layer film having ABC structure and an overall thickness of 12 μm. The thickness of the overlayers was in each case 1.2 μm.

Overlayer (A):
100% by weight of polyester raw material, consisting of 97% by weight of copolyester (of 90 mol % of terephthalic acid, 10 mol % of isophthalic acid and 100 mol % of ethylene glycol) and 3.0% by weight of silica particles (SYLYSIA® 430 from Fuji, Japan) having a $d_{50}$ value of 3.4 μm and a SPAN 98 of 1.6.

Base layer (B):
100.0% by weight of polyethylene terephthalate 4023 from KoSa, Germany, having an SV value of 800

Overlayer (C), mixture of:
93.0% by weight of polyethylene terephthalate 4023 from KoSa, Germany, having an SV value of 800
7.0% by weight of masterbatch of 97.75% by weight of polyethylene terephthalate, 1.0% by weight of SYLOBLOC® 44 H (synthetic $SiO_2$ from Grace, USA) and
1.25% by weight of AEROSIL® TT 600 (pyrogenic $SiO_2$ from Degussa, Germany)

The production conditions in the individual process steps were:

| Extrusion: | Temperatures | A layer: | 290° C. |
|---|---|---|---|
| | | B layer: | 290° C. |
| | | C layer: | 290° C. |
| | Temperature of the takeoff roll | | 25° C. |
| Longitudinal stretching: | Stretching temperature: | | 125° C. |
| | Longitudinal stretching ratio: | | 4.1 |
| Transverse stretching: | Stretching temperature: | | 130° C. |
| | Transverse stretching ratio: | | 3.9 |
| | Temperature: | | 230° C. |
| Setting: | Time: | | 3 s |

The film had the required low gloss, the required low opacity, the required low volume opacity and the required high transparency. In addition, it was possible to produce the film very efficiently, i.e. without tears, and it also showed the desired processing performance. The film structure and the properties of the films produced in the examples which were achieved are listed in Tables 2 and 3.

EXAMPLE 2

In a similar manner to Example 1, coextrusion was used to produce a three-layer film having an overall thickness of 12 μm. Only the composition of the overlayer A was changed:

Overlayer (A):
100% by weight of polyester raw material, consisting of 95.5% by weight of copolyester (of 90 mol % of terephthalic acid, 10 mol % of isophthalic acid and 100 mol % of ethylene glycol) and 4.5% by weight of silica particles (Sylysia® 430 from Fuji, Japan) having a $d_{50}$ value of 3.4 μm and a SPAN98 of 1.6

The gloss was distinctly reduced compared to Example 1.

EXAMPLE 3

Compared to Example 1, only the formulation of the overlayer A was changed:

Overlayer (A):
100% by weight of polyester raw material, consisting of 95.5% by weight of copolyester (of 80 mol % of terephthalic acid, 20 mol % of isophthalic acid and 100 mol % of ethylene glycol) and 4.5% by weight of silica particles (SYLYSIA® 430 from Fuji, Japan) having a $d_{50}$ value of 3.4 μm and a SPAN98 of 1.6

In comparison to Example 2, the opacity has distinctly reduced and the transparency increased with virtually unchanged gloss.

EXAMPLE 4

Compared to Example 3, the thickness of the overlayer A was increased to 1.8 μm. This allowed the gloss to be reduced without significantly changing the opacity and the transparency.

EXAMPLE 5

Compared to Example 4, the overall thickness of the film was increased to 23 μm. The opacity and transparency of this film are only slightly worse than the film of thickness 12 μm.

EXAMPLE 6

Compared to Example 1, only the formulation of the overlayer A was changed:

Overlayer (A):
85% by weight of copolyester (of 78 mol % of tere-phthalic acid, 22 mol % of isophthalic acid and 100 mol % of ethylene glycol) and 5% by weight of silica particles (SYLYSIA® 430 from Fuji, Japan) having a $d_{50}$ value of 3.4 μm and a SPAN98 of 1.6
15% by weight of polyethylene terephthlate 4023 from KoSa, Germany having an SV value of 800

COMPARATIVE EXAMPLE 1 (CE1)

In comparison to Example 1, the film was now produced with the following formulation of the overlayer (A):

Overlayer (A):
100% by weight of polyester raw material consisting of 98% by weight of polyethylene terephthalate and 2.0% by weight of silica particles having a $d_{50}$ value of 3.4 μm The mattness of the film, the opacity and the transparency of the film and the producibility have become distinctly worse.

Tables 2 and 3 show a compilation of the experimental results:

TABLE 2

| Example | Film thickness in μm | Film structure | Layer thicknesses in μm | | | Particles in the layers | | | $d_{50}$ value of the Particles in the layers in μm | | Pigment concentrations in ppm | | Isophthalate content of the layer A in mol % |
|---|---|---|---|---|---|---|---|---|---|---|---|---|---|
| | | | A | B | C | A | B | C | A | C | A | C | |
| E 1 | 12 | ABC | 1 | 9.6 | 1 | SYLYSIA ® 430 | none | SYLOBLOC ® 44 H AEROSIL ® TT 600 | 3 | 2.5 0.04 | 30 000 | 700 875 | 10 |
| E 2 | 12 | ABC | 1 | 9.6 | 1 | SYLYSIA ® 430 | none | SYLOBLOC ® 44 H AEROSIL ® TT 600 | 3 | 2.5 0.04 | 45 000 | 700 875 | 10 |
| E 3 | 12 | ABC | 1 | 9.6 | 1 | SYLYSIA ® 430 | none | SYLOBLOC ® 44 H AEROSIL ® TT 600 | 3 | 2.5 0.04 | 45 000 | 700 875 | 20 |
| E 4 | 12 | ABC | 2 | 9 | 1 | SYLYSIA ® 430 | none | SYLOBLOC ® 44 H AEROSIL ® TT 600 | 3 | 2.5 0.04 | 45 000 | 700 875 | 20 |
| E 5 | 23 | ABC | 2 | 20 | 1 | SYLYSIA ® 430 | none | SYLOBLOC ® 44 H AEROSIL ® TT 600 | 3 | 2.5 0.04 | 45 000 | 700 875 | 20 |
| E 6 | 12 | ABC | 1 | 9.6 | 1 | SYLYSIA ® 430 | none | SYLOBLOC ® 44 H AEROSIL ® TT 600 | 3 | 2.5 0.04 | 42 500 | 700 875 | 18.7 |
| CE 1 | 12 | ABC | 1 | 9.6 | 1 | SYLYSIA ® 430 | none | SYLOBLOC ® 44 H AEROSIL ® TT 600 | 3 | 2.5 0.04 | 20 000 | 700 875 | 0 |

TABLE 3

| Example | Average roughness $R_a$ | | Measurement for the gas flow | | Planar orientation Δp | Gloss 60° | | Gloss 20° | Volume | | | Production performance |
|---|---|---|---|---|---|---|---|---|---|---|---|---|
| | A side | C side | A side | C side | | A side | C side | Opacity (%) | opacity (%) | Transparency (%) | | |
| E 1 | 280 | 60 | 10 | 130 | 0.165 | 55 | 145 | 35 | 5.2 | 88 | 0 |
| E 2 | 320 | 60 | 9 | 130 | 0.165 | 44 | 140 | 38 | 8.1 | 86 | 0 |
| E 3 | 320 | 60 | 8 | 130 | 0.165 | 46 | 141 | 32 | 1.8 | 89 | ++ |
| E 4 | 320 | 60 | 8 | 130 | 0.165 | 42 | 138 | 34 | 2 | 87 | 0 |
| E 5 | 320 | 60 | 8 | 130 | 0.165 | 42 | 139 | 36 | 2.7 | 85 | ++ |
| E 6 | 320 | 60 | 7 | 130 | 0.165 | 42 | 139 | 36 | 2.7 | 85 | ++ |
| CE1 | 210 | 60 | 15 | 130 | 0.165 | 70 | 160 | 62 | 26.5 | 79 | − |

Explanation of symbols for the production performance of the films:
++: no tears, low production costs
−: frequent tears, high production costs of the film

The invention claimed is:

1. A polyester film which has at least one base layer (B) and has at least one matt overlayer (A), wherein the overlayer (A) comprises particles which have a median particle diameter $d_{50}$ of from 2 to 10 μm and have a SPAN98 smaller than or equal to 2, and wherein the overlayer (A) comprises a single polyester consisting essentially of (i) at least one dicarboxylic acid; (ii) at least one aliphatic, cycloaliphatic or aromatic diol and (iii) from 4 to 30 mol % of isophtbalic acid units, based on the total amount of acid in the polyester in this layer, said film exhibiting a transparency of greater than 80%.

2. The polyester film as claimed in claim 1, wherein the particle concentration in the overlayer (A) is from 10 000 to 70 000 ppm, based on the total weight of this layer.

3. The polyester film as claimed in claim 1, wherein the particle diameter $d_{50}$ is from 2.2 to 9 μm.

4. The polyester film as claimed in claim 1, wherein the polyester present in the overlayer (A) contains from 6 to 28 mol % of isophthalic acid units, and said film exhibits a transparency of greater than 84%.

5. The polyester film as claimed in claim 1, wherein the particles present in the overlayer (A) have a SPAN 98 smaller than or equal to 1.9.

6. The polyester film as claimed in claim 1, wherein the particles present in the overlayer (A) are at least one of either organic or inorganic particles.

7. The polyester film as claimed in claim 1, wherein the polyester present in the overlayer (A) is a copolyester which consists essentially of terephthalate units, isophthalate units, and ethylene glycol units.

8. The polyester film as claimed in claim 1, wherein the base layer (B) is composed of at least 80% by weight of a thermoplastic polyester.

9. The polyester film as claimed in claim 8, wherein polyethylene terephthalate is used as thermoplastic polyester for the base layer (B).

10. The polyester film as claimed in claim 1, wherein no external particles are present in the base layer (B).

11. The polyester film as claimed in claim 1, which has an ABC layer structure, (A) and (C) being the overlayers, which are identical or different.

12. The polyester film as claimed in claim 1, which has a planar orientation Δp smaller than or equal to 0.170.

13. The polyester film as claimed in claim 1, which has an opacity smaller than 45%.

14. The polyester film as claimed in claim 1, which has a volume opacity smaller than 15%.

15. The polyester film as claimed in claim 1, wherein the matt overlayer (A) has a gloss smaller than 70.

16. A process for producing a polyester film as claimed in claim 1, encompassing the steps of:

a) production of a multilayer film via coextrusion and shaping of the melts to give flat melt films, b) biaxial stretching of the film, and c) heat-setting of the stretched film.

17. Packaging film comprising polyester film as claimed in claim 1.

18. Packaging film as claimed in claim 17, wherein the packaging procedure takes place on high-speed packaging machinery.

* * * * *